United States Patent Office 2,734,089
Patented Feb. 7, 1956

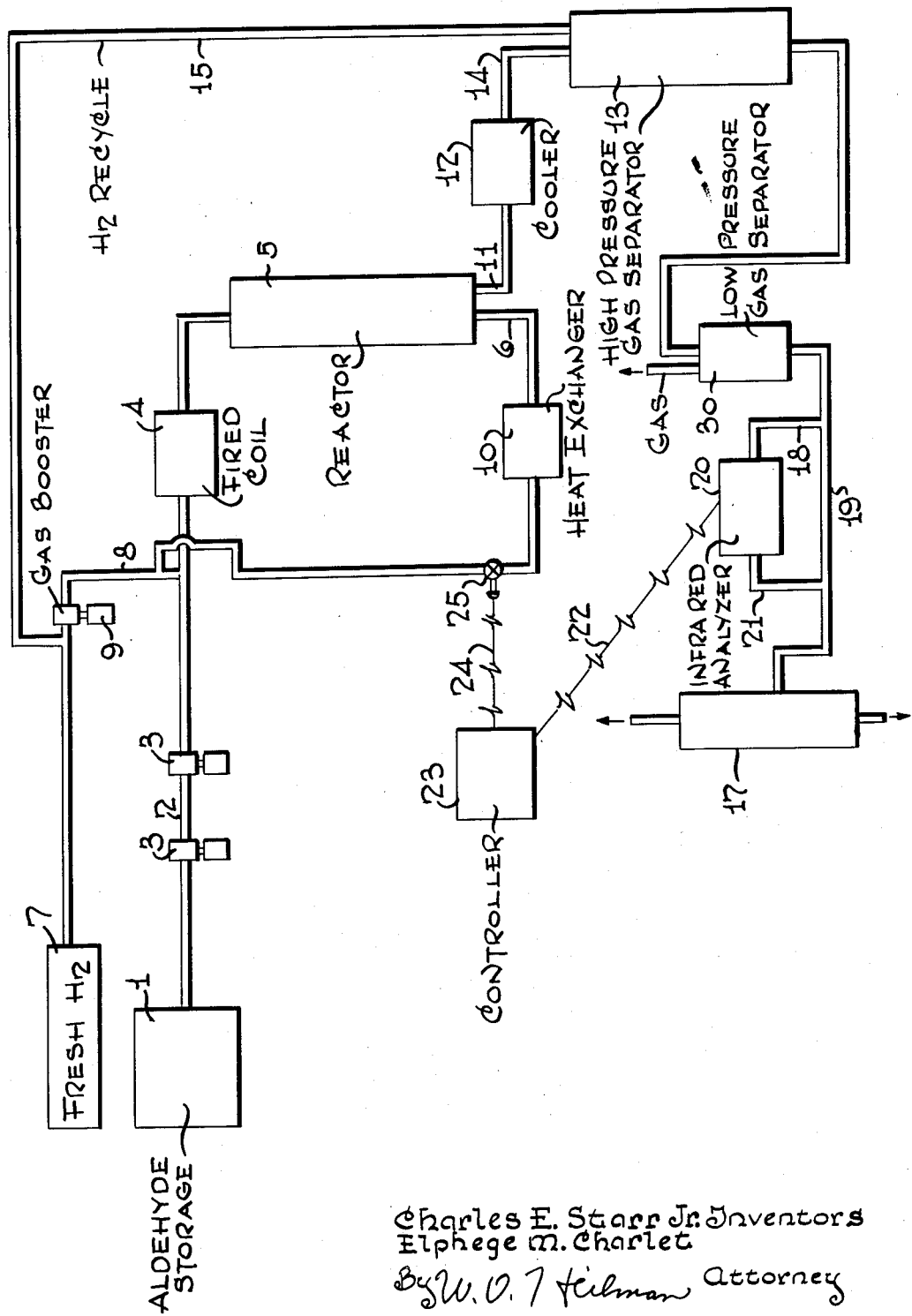

2,734,089

INFRARED CONTROL METHOD FOR ALCOHOL SYNTHESIS PROCESS

Charles E. Starr, Jr., and Elphege M. Charlet, Baton Rouge, La., assignors to Esso Research and Engineering Company, a corporation of Delaware Application May 8, 1951, Serial No. 225,134

4 Claims. (Cl. 260—638)

This invention relates to a novel control method for use in an alcohol synthesis process, making possible improved operating efficiency. In accordance with this invention a novel analytical procedure is employed, utilizing a particular wave length of infra-red energy, to determine the concentration of undesired byproducts formed in the alcohol synthesis reaction. This enables control of the reaction to minimize the formation of the undesired products.

The synthesis of alcohol from the reaction of olefinic organic compounds, hydrogen, and carbon monoxide to yield aldehydes and the subsequent reduction of these aldehydes with hydrogen to yield alcohols is well known at the present time. In the first step of this process a carbonylation catalyst is employed which may consist of the salt of a catalytically active metal with high molecular weight organic acids, such as oleic acid, stearic acid, naphthenic acid, etc. For example, a suitable catalyst salt may be cobalt, or iron, oleate, stearate, naphthenate and the like. In the presence of such a catalyst, olefins, hydrogen, and carbon monoxide may be reacted to provide aldehydes having one more carbon atom than the original olefins. In a second stage of the alcohol synthesis process the carbonylation reaction products are contacted with hydrogen with the subsequent formation of alcohols.

The present invention is particularly concerned with the second stage of the process identified above. As indicated this stage of the alcohol synthesis is essentially the reaction of hydrogen and aldehydes. It must be appreciated, however, that in actual practice the feed stream to the hydrogenation step, as it is generally derived from a prior carbonylation step, is contaminated with other constituents such as ethers, ketones, esters, etc. More precisely this invention is, therefore, of application to the hydrogenation or second stage processing of a carbonylation reaction product stream. A typical analysis of such a stream is presented in Table I below:

TABLE I

Composition of carbonylation reaction products

| Compound | Wt. Percent | Range, Wt. Percent |
|---|---|---|
| Acid | 0.9 | 1-2 |
| Hydrocarbons | 17.8 | 15-20 |
| Unsaturated Ether | 3.4 | 0-5 |
| $C_{16}$ Ester | 2.6 | 0-5 |
| $C_9$ Ester | 2.2 | 0-5 |
| Saturated Ether | 0 | 0-5 |
| $C_8$ Alcohol | 7.2 | 5-25 |
| $C_{24}$ Acetal | 14.7 | 10-20 |
| $C_8$ Aldehyde | 35.2 | 20-40 |
| $C_{16}$ Hemi-acetal | 16.0 | 10-20 |

In hydrogenating a feed stream of the general composition indicated in Table I, any suitable hydrogenation catalyst may be employed such as nickel, copper chromite, cobalt, sulfactive catalysts of the type of oxides, and sulfides of tungsten, nickel, molybdenum or the like, either as such or supported on a carrier. Depending upon the particular catalyst, the temperatures employed are in the range of about 300 to 500° F., the pressure is selected from the range of about 2500 to 4500 pounds p. s. i., and the hydrogen feed rate is about 5000 to 20,000 normal cubic feet per barrel of feed.

Hydrogenating a carbonylation reaction product stream, utilizing the indicated catalysts and conditions of reaction, results in the formation of a product stream consisting principally of alcohols, but contaminated with a variety of impurities or byproducts of the reaction. In particular the hydrogenation product may contain carbonyls, and esters. The carbonyl content is extremely undesirable as these compounds react with the alcohol product to form acetals. Similarly, esters are undesirable since these decompose to form fatty acids which catalyze increased formation of acetals. Consequently, in the conduct of the hydrogenation process described, in order to minimize the concentration of carbonyls and esters in the final product, it is important to prevent the undesired formation of acetals. It is, therefore, the principal object of this invention to provide a hydrogenation control method effective to permit the attainment of minimum yields of carbonyls and esters.

A method for minimizing the carbonyl and ester content in the hydrogenation process has been complicated by lack of a suitable analytical method to detect total carbonyl and ester content. Heretofore no single chemical test has been available to determine total carbonyls and esters so that heretofore there has not been a suitable control of the production of these undesirable components. For example, the presently known and used methods of determining carbonyl and ester content requires sampling of the particular stream at the synthesis plant and transportation of the sample to a control laboratory for a tedious analysis by the classical organic functional group analyses, such as KOH number determinations. As a result, a time delay of about three hours is necessitated between the time of sampling and the completion of analysis thus making it impossible to continuously and precisely control the alcohol synthesis hydrogenation.

It is, therefore, a more specific object of this invention to provide an improved analytical method whereby total carbonyl and ester content in an alcohol stream may quickly and continuously be determined.

The objects of this invention have been attained by utilization of an infra-red analytical and control process. Thus, infra-red energy having a wave length of 5.8 microns is employed to irradiate a sample of the alcohol product. The infra-red absorption of the sample at this particular wave length is effective to provide information as to the total carbonyl and ester content of the alcohol stream. This information may be exhibited as a visual indication for manual control of the process, or the information may be provided as an electrical signal operative to control automatically process parameters so as to permit obtaining an alcohol product having substantially no carbonyl, or ester, content.

To present more clearly the problem of which the solution is provided by this invention, the analytical compositions of typical alcohol product streams from the synthesis process are presented in Table II below:

TABLE II

*Composition of alcohol product streams*

| Wt. Percent | Comp. A. | Comp. B. | Comp. C. | Range, Wt. Percent |
|---|---|---|---|---|
| Acid | 0 | 0 | 0 | 0 |
| Hydrocarbon | 35 | 41 | 21 | 15-40 |
| Alcohol | 54 | 52 | 68 | 50-70 |
| Aldehyde | 1 | 1 | 1 | 0-2 |
| Ketone | 1 | 1 | 2 | 0-1 |
| Unsaturated Ether | 3 | 2 | 4 | 0-4 |
| Ester | 1 | 0 | 0 | 0-1 |
| Saturated Ether | 3 | 2 | 1 | 0-1 |
| Acetal | 2 | 1 | 3 | 0-4 |
|  | 100 | 100 | 100 |  |

The difficulty in attempting to analyze a composition such as that indicated in Table II by infra-red methods may be appreciated by those skilled in the art. Each of the constituents listed in Table II has infra-red absorbing characteristics. Because of this, a unique problem is involved in attempting to determine an infra-red analysis method selective to carbonyls and esters but insensitive to the other constituents present. This of course is particularly true by virtue of the continuously varying nature of the composition which is obtained. However, in accordance with this invention, it has been determined that if substantially monochromatic infra-red energy of about 5.8 microns is employed, absorption of this wave length of infra-red energy will selectively be a function of carbonyl and ester content regardless of the presence, or concentrations of any other impurities. As an indication of the effectiveness of this analytical method, the following examples are given showing the precision with which carbonyl and ester contents were determined using infra-red energy of 5.8 microns.

The alcohol compositions were chosen as indicated in the table to cover a range of contamination by aldehydes and esters. The total aldehyde and ester content of the different alcohol samples was determined by the infra-red analysis technique described. That is, infra-red energy having a wave length of 5.8 microns was passed through a sample of alcohol to determine the aldehyde and ester content in terms of weight percent. In addition, the conventional technique for the chemical analysis of carbonyl content was followed to provide comparative figures showing the inadequacy of the chemical analysis method for control purposes. These results are set forth in Table III below:

TABLE III

| Run | Hrs. | Infra-Red, Wt. Percent Aldehyde and Ester | Carbonyl #* by Chemical Analysis | Wt. Percent $C_8$* Aldehyde |
|---|---|---|---|---|
| A | 39-62 | 2.0 | 3 | 0.70 |
| B | 64 | 3.7 | 11 | 2.58 |
| C | 67 | 3.6 | 10 | 2.34 |
| D | 86 | 2.0 | 3 | 0.70 |
| E | 63-86 | 3.4 | 9 | 2.10 |
| F | 183-206 | 2.4 | 4 | 0.935 |
| G | 534-529 | 1.4 | 3 | 0.70 |

*Wt. Percent = $\dfrac{\text{Carbonyl \#}}{420}$

It will be noted from Table III that the weight percent aldehyde as determined by chemical analysis is an extremely poor basis for controlling the hydrogenation process. The weight percent aldehyde, as determined by chemical analysis, correlates very poorly with the total amount of aldehydes plus esters.

In practicing this invention various types of infra-red analytical equipment may be employed. For example, conventional infra-red analytical apparatus may be used of the nature including a monochromator which may be set to provide infra-red energy of 5.8 microns. Analytical apparatus of this nature is commercially available and essentially consists of an infra-red source, a monochromator which may be adjusted to permit transmission of 5.8 micron infra-red energy, an infra-red transparent sample cell, and an infra-red detector such as a bolometer or equivalent. Alternatively, other types of infra-red apparatus may be used providing means other than a monochromator for obtaining infra-red energy having a wave length of 5.8 microns. Thus, for example, conventional equipment may be used which is provided with fluid cells or infra-red filters which may be filled, or selected respectively, so as to provide for transmission of infra-red energy of 5.8 microns. Insofar as apparatus of this type is well known, no further description will be made of this element.

Having then a suitable apparatus for production of infra-red energy of 5.8 microns, and for transmission of this energy through a sample cell, and for detection of the transmitted energy, the method of this invention may be readily carried out. As a first step, calibration curves may be prepared showing the infra-red absorption characteristics at 5.8 microns of a variety of control samples having varying known concentrations of carbonyls and esters. Such a calibration curve may be prepared which will indicate carbonyl and ester content directly on a record controlled by the infra-red detector of the apparatus. Alternatively, the electrical output of the infra-red detector may be plotted on a calibration curve as a function of the carbonyl and ester content of control samples. Consequently, on analysis of an unknown sample, by reference to such a calibration curve, the carbonyl and ester content of the sample may be readily indicated. By reference to the output of the infra-red detector while examining a given sample, therefore, manual control of the process may be maintained in accordance with the indicated carbonyl and ester content of the alcohol product.

Preferably, however, in the practice of this invention the output of the infra-red detector is supplied to an automatic control apparatus operative to open or close valves effective to create changes in the hydrogenation conditions, namely temperature of the catalyst, in response to changes in composition of the hydrogenation product streams. For this purpose conventional control apparatus is employed of the nature to provide electrical, or pneumatic changes in a control line operative to open or close the desired valves in response to a given change in the electrical input to the apparatus. By this means it is possible to critically control the process variables of the hydrogenation process so as to maintain a minimum production of total carbonyl and ester compounds.

The nature of this invention may be more fully understood by reference to the accompanying drawing, and the following description. The drawing diagrammatically represents a suitable flow plan of the hydrogenation stage and subsequent stages of an alcohol synthesis process, and also illustrates application of the novel control method of this invention. Referring to the drawing, the numeral 1 designates a storage vessel in which a suitable aldehyde feed stream is contained. This feed stream may be the produce stream obtained from a prior carbonylation reaction. In the practice of this invention, to obtain $C_8$ alcohol products, the feed stream principally comprises $C_8$ aldehydes which may be contaminated with alcohol, acetal, ethers, and esters. The aldehyde stream is conducted from storage zone 1 through line 2 and through compressors 3, and heater 4 for introduction into reactor 5. Compressors 3 and heating means 4 are operated so that the feed stream is introduced to reactor 5 at a temperature of about 300 to 500° F., and a pressure of about 2500 to 4500 p. s. i. Reactor 5 consists of a high pressure reactor of any desired type. As illustrated, the reactor may consist essentially of essentially of a vertical tower in which the hydrogenation catalyst may be maintained as a mass of material essentially packing the reactor. Consequently, the aldehyde feed stream will pass downwardly through the interstices and in contact with the hydrogenation catalyst. Hydrogen is then introduced to the reactor 5, for example at the bottom of the reactor through line 6. This hydrogen may then move upwardly through the catalyst mass and down flowing aldehyde feed stream so as to permit reaction with the aldehydes to form alcohols. Fresh hydrogen for this purpose may be maintained in storage zone 7 for transmission to zone 5 through line 8, compressor 9 and heat exchanger 10. Heat exchanger 10, and compressor 9 are operated so that the hydrogen entering zone 5 is at a temperature of about 300 to 500° F., and a pressure of about 2500 to 4500 p. s. i. The hydrogen feed rate is maintained in the range of about 5000 to 20,000 normal cubic feet per barrel of feed. As will be seen either the hydrogen feed rate, or the hydrogen temperature, and pressure, or the aldehyde feed stream temperatures, or pressure is critically varied in accordance with this invention.

The hydrogenation products may be removed through line 11 consisting of alcohols formed from the reaction, unreacted aldehydes and byproducts of the reaction of the nature indicated in Table II.

This product stream may be conducted through line 11 to a cooler 12 serving to drop the temperature of the alcohol product stream to about 100° F. Thereafter on passage of the product stream to zone 13 through line 14, unreacted hydrogen gas may be separated from the liquid alcohol product so that hydrogen gas may be recycled to the hydrogenation step of the process through line 15. The hydrogen separation zone 13 may, if desired, consist of a single stage separation zone. More precisely, however, two zones are employed as shown in the drawing, in which the first zone 13 is operated at a higher pressure than the second separation zone 30. For example, zone 13 may be operated at about 3000 p. s. i., while zone 30 may be operated at about 50 p. s. i. The alcohol product which leaves the gas separator, or separators, is then conducted to a stabilizing tower 17 which may consist of a simple fractionation zone operative to provide a bottom product consisting principally of the desired synthetic alcohols.

In accordance with this invention, the product stream obtained from reaction zone 5 is subjected to infra-red analysis at some time after withdrawal of the product stream from zone 5. Preferably analysis is made after the product has been passed through the gas separator, and just prior to transfer of the product to fractionation zone 17. Thus, as illustrated, bleeder line 18 may be positioned in line 19, carrying the alcohol product stream from zone 30 to zone 17. Consequently, a portion of the alcohol of the product stream may continuously be withdrawn through line 18 for passage through infra-red analyzer 20, and may be returned to line 19 through line 21.

As described, the infra-red analyzer 20 is of conventional construction of the nature to provide a determination of the infra-red absorbing characteristics of the alcohol product stream at a wave length of 5.8 microns. Further, the analyzer is of a suitable nature to provide an electrical signal which may be conducted through the electrical lead 22 proportional in magnitude to the aldehyde and ester content of the alcohol product stream. This electrical signal when impressed upon the conventional control apparatus 23, may be used to provide a further electrical signal or a pneumatic signal in line 24 operative to control valve 25 in line 8. By this means, operation of valve 25 may automatically be controlled in accordance with the carbonyl and ester content of the alcohol product stream of line 19. For example, when reactor 5 is efficiently operated, the carbonyl and ester content of the alcohol product stream of line 19 will be substantially nil, or of the order of about 0.2 wt. percent. However, when catalyst present in reactor 5 has become somewhat exhausted, or whenever temperature and pressure conditions become unsuitable, the carbonyl and ester content of the alcohol product stream will increase to about one wt. percent or higher. Changes in the carbonyl and ester content will be indicated by changes in the electrical output of the infra-red analyzer 20 so that, for example, any increase in the carbonyl and ester content will result in the control system partially opening valve 25 so as to permit increased flow of hydrogen to the hydrogenation zone, resulting in the decreased production of carbonyls and esters. As described, other variables may be altered to effect this same result in the same manner.

What is claimed is:

1. A method of controlling an alcohol synthesis process in which an aldehyde feed stream is hydrogenated under variable conditions of hydrogenation severity to form an alcohol product stream consisting of the steps of withdrawing at least a portion of the total crude alcohol product stream and passing this portion through an infra-red transparent sample cell, passing infra-red energy of 5.8 microns wave length through the said sample cell, impinging transmitted infra-red energy on an infra-red detector operative to provide an electrical signal proportional to the infra-red absorption of the alcohol product, and thereafter adjusting the hydrogenation severity in accordance with changes in the said electrical signal.

2. The process defined by claim 1 in which the said hydrogenation severity is adjusted by controlling the proportion of hydrogen provided during hydrogenation in accordance with the said electrical signal.

3. The process defined by claim 1 in which the said hydrogenation severity is increased whenever substantial absorption of infra-red energy occurs by increasing the temperature of hydrogenation.

4. The process defined by claim 1 in which the said hydrogenation severity is increased whenever substantial absorption of infra-red energy occurs by increasing the pressure of hydrogenation.

References Cited in the file of this patent

UNITED STATES PATENTS

| 2,386,830 | Wright | Oct. 16, 1945 |
|---|---|---|
| 2,386,831 | Wright | Oct. 16, 1945 |
| 2,459,404 | Anderson, Jr. | Jan. 18, 1949 |
| 2,462,946 | Coggeshall | Mar. 1, 1949 |
| 2,462,995 | Ritzmann | Mar. 1, 1949 |
| 2,500,913 | Schexnailder, Jr. | Mar. 14, 1950 |
| 2,518,307 | Groebe | Aug. 8, 1950 |
| 2,549,416 | Brooks | Apr. 17, 1951 |
| 2,594,341 | Owen et al. | Apr. 29, 1952 |
| 2,636,904 | Starr et al. | Apr. 28, 1953 |

OTHER REFERENCES

Brattain: "Some Uses of Infra-Red Spectroscopy for Hydrocarbon Analysis," California Oil World and Petroleum Industry (second issue), January 1943 (pgs. 9 to 17).